(12) United States Patent
Tokuda et al.

(10) Patent No.: US 10,193,350 B2
(45) Date of Patent: Jan. 29, 2019

(54) POWER SUPPLYING DEVICE AND POWER RECEIVING DEVICE

(71) Applicant: SONY CORPORATION, Tokyo (JP)

(72) Inventors: Yoshiichi Tokuda, Tokyo (JP); Tadashi Morita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 144 days.

(21) Appl. No.: 15/031,727

(22) PCT Filed: Oct. 23, 2014

(86) PCT No.: PCT/JP2014/078220
§ 371 (c)(1),
(2) Date: Apr. 23, 2016

(87) PCT Pub. No.: WO2015/072304
PCT Pub. Date: May 21, 2015

(65) Prior Publication Data
US 2016/0248261 A1 Aug. 25, 2016

(30) Foreign Application Priority Data

Nov. 14, 2013 (JP) .................................. 2013-236114

(51) Int. Cl.
*H02J 3/00* (2006.01)
*H02J 1/00* (2006.01)
(Continued)

(52) U.S. Cl.
CPC ................ *H02J 4/00* (2013.01); *G05B 15/02* (2013.01); *H02J 1/00* (2013.01); *H02J 3/14* (2013.01);
(Continued)

(58) Field of Classification Search
CPC ........ H02J 4/00; H02J 1/00; H02J 9/06; H02J 2003/143; G05B 15/02
(Continued)

(56) References Cited

U.S. PATENT DOCUMENTS 9,660,451 B1 * 5/2017 Naiknaware ........ H02J 13/0024
2008/0028237 A1 1/2008 Knight
(Continued)

FOREIGN PATENT DOCUMENTS

CN 103765718 A 4/2014
EP 2120442 A1 11/2009
(Continued)

OTHER PUBLICATIONS

Office Action for JP Patent Application No. 2016-248710, dated Nov. 7, 2017, 07 pages of Office Action and 04 pages of English Translation.
(Continued)

*Primary Examiner* — Ly D Pham
(74) *Attorney, Agent, or Firm* — Chip Law Group

(57) ABSTRACT

Provided is a power supplying device including: a reception unit configured to receive, from another device, a request for power supply performed through a direct-current bus line through which DC power flows; a power determination unit configured to determine whether power supply is possible, on the basis of the request for power supply; and a power control unit configured to, when the power determination unit determines that the power supply is possible, preform control to determine presence or absence, and in a case of the absence of the control right, acquire the control right and notify the other device of the acquisition of the control right.

10 Claims, 5 Drawing Sheets

(51) Int. Cl.
*H02J 1/10* (2006.01)
*H02J 3/18* (2006.01)
*H02J 4/00* (2006.01)
*H02J 3/14* (2006.01)
*G05B 15/02* (2006.01)
*H02J 9/06* (2006.01)
*H02J 7/34* (2006.01)
*H02J 7/00* (2006.01)

(52) U.S. Cl.
CPC .............. *H02J 9/06* (2013.01); *H02J 7/0055* (2013.01); *H02J 7/34* (2013.01); *H02J 2003/143* (2013.01)

(58) Field of Classification Search
USPC ........................................................ 700/297
See application file for complete search history.

(56) References Cited

U.S. PATENT DOCUMENTS

| | | | | |
|---|---|---|---|---|
| 2009/0271645 | A1* | 10/2009 | Mori | G06F 1/3221 713/320 |
| 2011/0064212 | A1 | 3/2011 | Cooper et al. | |
| 2011/0074350 | A1* | 3/2011 | Kocher | B60L 11/1816 320/109 |
| 2012/0119586 | A1 | 5/2012 | Carralero et al. | |
| 2012/0293011 | A1* | 11/2012 | Byun | H02J 7/0027 307/104 |
| 2014/0210267 | A1 | 7/2014 | Ishida et al. | |
| 2015/0100172 | A1* | 4/2015 | Forbes, Jr. | H02J 3/32 700/295 |

FOREIGN PATENT DOCUMENTS

| | | |
|---|---|---|
| EP | 2286578 A1 | 2/2011 |
| JP | 2006-288162 A | 10/2006 |
| JP | 2009-140507 A | 6/2009 |
| JP | 2011-205871 A | 10/2011 |
| JP | 2013-090560 A | 5/2013 |
| JP | 2013-183573 A | 9/2013 |
| JP | 2013-226022 A | 10/2013 |
| JP | 5728582 B2 | 6/2015 |
| WO | 2009/138711 A1 | 11/2009 |
| WO | 2012/064409 A2 | 5/2012 |
| WO | 2013/038458 A1 | 3/2013 |

OTHER PUBLICATIONS

Office Action for CN Patent Application No. 201480060449.5, dated Mar. 5, 2018, 03 pages of Office Action and and 05 pages of English Translation.

Office Action for JP Patent Application No. 2016-248710, dated Mar. 8, 2018, 03 pages of Office Action and and 03 pages of English Translation.

Office Action for JP Patent Application No. 2015-547713, dated Jun. 5, 2018, 05 pages of Office Action and 02 pages of English Translation.

Extended European Search Report of EP Patent Application No. 18171408.0, dated Jun. 27, 2018, 07 pages.

* cited by examiner

POWER SUPPLYING DEVICE AND POWER RECEIVING DEVICE

CROSS REFERENCE TO RELATED APPLICATIONS

This application is a U.S. National Phase of International Patent Application No. PCT/JP2014/078220 filed on Oct. 23, 2014, which claims priority benefit of Japanese Patent Application No. JP 2013-236114 filed in the Japan Patent Office on Nov. 14, 2013. Each of the above-referenced applications is hereby incorporated herein by reference in its entirety.

TECHNICAL FIELD

The present invention relates to power supplying devices and power receiving devices.

BACKGROUND ART

It is known that there is an uninterruptible power source device which includes a rechargeable battery and thereby can continue to supply power from the rechargeable battery to an apparatus connected thereto for a predetermined period of time without interruption of power supply even if disruption of power from an input power source occurs. A technique has been proposed which distributes such a power source device to individual consumers so that power is supplied to the consumers when an anomaly in power supply, such as power failure or the like, occurs (see Patent Literatures 1 and 2).

CITATION LIST

Patent Literature

Patent Literature 1: JP 2011-205871A
Patent Literature 2: JP 2013-90560A

SUMMARY OF INVENTION

Technical Problem

When power is supplied by power source devices equipped with a rechargeable battery, then if an anomaly occurs in power supply, some power source devices may stop supplying power earlier than expected while other power source devices may hold a greater amount of power than necessary. Therefore, when an anomaly occurs in power supply, there may be a waste of power. Also, although existing technologies are based on the assumption that AC power is supplied when power is supplied to consumers during a power failure, it is desirable that DC power be supplied, taking into consideration the efficiency of power supply from a rechargeable battery.

With the above in mind, the present disclosure proposes a novel and improved power supplying device and power receiving device capable of efficiently supplying power through a direct-current power line when an anomaly occurs in external power supply.

Solution to Problem

According to the present disclosure, there is provided a power supplying device including: a reception unit configured to receive, from another device, a request for power supply performed through a direct-current bus line through which DC power flows; a power determination unit configured to determine whether power supply is possible, on the basis of the request for power supply; a transmission unit configured to, when the power determination unit determines that the power supply is possible, transmits a response to the other device, as a candidate for power supply; and a power control unit configured to preform control to determine presence or absence of a right to control the direct-current bus line, and in a case of the absence of the control right, acquire the control right and notify the other device of the acquisition of the control right.

According to the present disclosure, there is provided a power receiving device including: a transmission unit configured to transmit a request for power supply performed through a direct-current bus line through which DC power flows, to other devices, when a predetermined condition is satisfied; and a power control unit configured to perform control to, when receiving a response from the other devices capable of supplying power as candidates for power supply, select at least one from the other devices that have transmitted responses, as a candidate for power supply, and transmit a request for power supply to the other device selected.

Advantageous Effects of Invention

As described above, according to the present disclosure, a novel and improved power supplying device and power receiving device can be provided that are capable of efficiently supplying power through a direct-current power line when an anomaly occurs in external power supply.

Note that the effects described above are not necessarily limited, and along with or instead of the effects, any effect that is desired to be introduced in the present specification or other effects that can be expected from the present specification may be exhibited.

DESCRIPTION OF EMBODIMENTS

Figure 1:
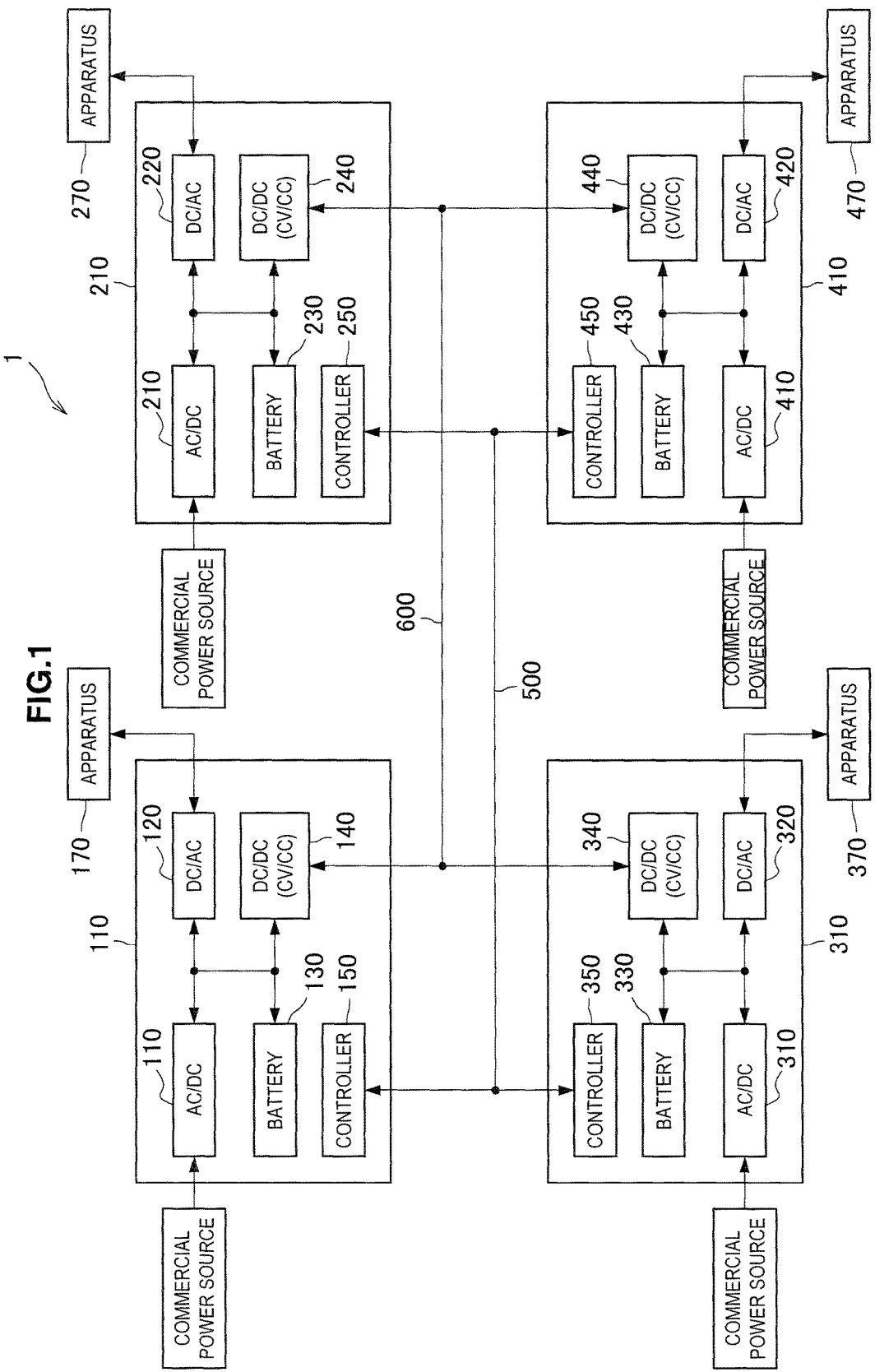
FIG. 1 is an illustrative diagram showing a configuration example of a power supply system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Embodiments of the Present Disclosure
1.1. Configuration Examples of System
1.2. Operation Examples
2. Conclusion <1. Embodiments of the Present Disclosure>
[1.1. Configuration Examples of System]

Firstly, a configuration example of a power supply system including power supplying devices according to an embodiment of the present disclosure with reference to the accompanying drawings. FIG. 1 is an illustrative diagram showing a configuration example of a power supply system according to an embodiment of the present disclosure. The configuration example of the power supply system according to an embodiment of the present disclosure will be described with reference to FIG. 1.

The power supply system 1 according to an embodiment of the present disclosure shown in FIG. 1 is a system in which power is interchanged through a direct-current bus line. As shown in FIG. 1, the power supply system 1 according to an embodiment of the present disclosure includes power supplying devices 100, 200, 300, and 400. The power supplying devices 100, 200, 300, and 400 are interconnected by a communication line 500 and a direct-current bus line 600.

The power supplying devices 100, 200, 300, and 400 are each equipped with an internal or external battery, and placed at home or in the office, for example. In this embodiment, the power supplying devices 100, 200, 300, and 400 are assumed to be equipped with internal batteries 130, 230, 330, and 430, respectively. The power supplying devices 100, 200, 300, and 400 accumulate and store power in the batteries 130, 230, 330, and 430, and can supply power from the batteries 130, 230, 330, and 430, having accumulated and stored power, to apparatuses connected to the power supplying devices 100, 200, 300, and 400.

The power supplying devices 100, 200, 300, and 400 according to this embodiment, when disruption of power supply from a commercial power source occurs, supply power stored in the batteries 130, 230, 330, and 430 to apparatuses 10, 20, 30, and 40 connected thereto, respectively, thereby preventing disruption of power supply to the power-consuming apparatuses 10, 20, 30, and 40. Examples of the power-consuming apparatuses 10, 20, 30, and 40 may include household electrical appliances, such as air conditioners, refrigerators, televisions, personal computers (PC), and the like, and vehicles that use electricity as a power source, such as electric cars.

Although FIG. 1 shows a case where a single apparatus is connected to a single power supplying device, the present disclosure is not limited to this example. A plurality of apparatuses that consume power may be connected to a single power supplying device.

The power supplying devices 100, 200, 300, and 400 have a function of, when disruption of power supply from a commercial power source has occurred, and the amount of power stored in the battery has become smaller than or equal to a predetermined amount, receiving power supplied from another power supplying device through the direct-current bus line 600, or supplying power to another power supplying device through the direct-current bus line 600.

A functional configuration example of the power supplying devices 100, 200, 300, and 400 will be described, focusing on the power supplying device 100 as a representative of the power supplying devices 100, 200, 300, and 400 shown in FIG. 1. As shown in FIG. 1, the power supplying device 100 according to an embodiment of the present disclosure includes an AC/DC converter 110, a DC/AC converter 120, a battery 130, a DC/DC converter 140, and a controller 150.

The AC/DC converter 110 converts AC power supplied from a commercial power source into DC power. The AC/DC converter 110 outputs the DC power obtained by converting the AC power to the DC/AC converter 120, the battery 130, and the DC/DC converter 140.

The DC/AC converter 120 converts DC power into AC power, and supplies the AC power to the apparatus 10 connected to the power supplying device 100. A power source for AC power supplied from the power supplying device 100 to the apparatus 10 is a commercial power source or the battery 130.

The battery 130 is a rechargeable battery, which can be charged and recharged. For example, even if disruption of power supply from a commercial power source occurs, the battery 130 has a sufficient capacity to supply power to the apparatus 10 over a predetermined period of time. The power supplying device 100, when disruption of power supply from a commercial power source occurs, operates to switch power supply to one from the battery 130, and supply power to the apparatus 10. The battery 130 can accumulate and store DC power obtained by conversion by the AC/DC converter 110, and in addition, may accumulate and store DC power that is generated by renewable energy, such as photovoltaic power generation, wind power generation, or the like.

The DC/DC converter 140 converts DC power obtained by conversion by the AC/DC converter 110 or DC power supplied from the battery 130 into DC power that can be output to the direct-current bus line 600. The conversion of DC power into DC power that can be output to the direct-current bus line 600 will be specifically described below.

The controller 150 controls the operation of the power supplying device 100. In this embodiment, when disruption of power supply from a commercial power source to the power supplying device 100 has occurred, and the capacity of the battery 130 has become smaller than or equal to the predetermined amount, the controller 150 controls the operation of the power supplying device 100 so that the power supplying device 100 requests the other power supplying devices 200, 300, and 400, through the communication line 500, to supply power to the direct-current bus line 600.

Also, in this embodiment, when disruption of power supply to another power supplying device 200, 300, or 400 has occurred, and the capacity of the battery 230, 330, or 430 has become smaller than or equal to the predetermined amount, then if the power supplying device 100 receives a request for power supply to the direct-current bus line 600 that is transmitted by the power supplying device 200, 300, or 400 through the communication line 500, the controller 150 controls the operation of the power supplying device 100 so that power is supplied through the direct-current bus line 600 to the power supplying device 200, 300, or 400 that has transmitted the request for power supply if the power supplying device can supply power.

The controller 150, when controlling the operation of the power supplying device 100 so that power is supplied through the direct-current bus line 600, changes the operation, depending on whether another power supplying device 200, 300, or 400 has already acquired the right to control the direct-current bus line 600. The controller 150 controls the operation of the power supplying device 100 so that power is supplied through the direct-current bus line 600 while the rating of the direct-current bus line 600 is not exceeded.

If none of the other power supplying devices 200, 300, and 400 has acquired the right to control the direct-current bus line 600, the controller 150 notifies the other supplying devices 200, 300, and 400 that the power supplying device 100 has acquired the right to control the direct-current bus line 600, before controlling the operation of the power supplying device 100 so that power is supplied through the direct-current bus line 600.

Meanwhile, if any of the other power supplying devices 200, 300, and 400 has acquired the right to control the direct-current bus line 600, the controller 150 controls the operation of the power supplying device 100 so that power is supplied through the direct-current bus line 600, on the basis of the premise that any of the other power supplying devices 200, 300, and 400 has acquired the right to control the direct-current bus line 600.

The controller 150 may determine whether power can be supplied, on the basis of information such as the amount of power stored in the battery 130, the predicted power consumption of the apparatus 10 in the near future, the predicted amount of electricity accumulated and stored in the battery 130 in the near future, or the like. Alternatively, the controller 150 may determine whether power can be supplied, on the basis of the priority of a power supplying device that has requested power supply.

The other power supplying devices 200, 300, and 400 have a configuration similar to that of the power supplying device 100. Specifically, the power supplying device 200 according to an embodiment of the present disclosure includes an AC/DC converter 210, a DC/AC converter 220, a battery 230, a DC/DC converter 240, and a controller 250. The power supplying device 300 according to an embodiment of the present disclosure includes an AC/DC converter 310, a DC/AC converter 320, a battery 330, a DC/DC converter 340, and a controller 350. The power supplying device 400 according to an embodiment of the present disclosure includes an AC/DC converter 410, a DC/AC converter 420, a battery 430, a DC/DC converter 440, and a controller 450.

The power supply system 1 according to an embodiment of the present disclosure, and the power supplying devices 100, 200, 300, and 400 included in the power supply system 1, have a configuration as shown in FIG. 1, whereby power can be efficiently supplied through a direct-current bus line when an anomaly occurs in power supply.

A configuration example of the power supply system 1 according to an embodiment of the present disclosure has been described above with reference to FIG. 1. Next, a functional configuration example of the controller 150 included in the power supplying device 100 according to an embodiment of the present disclosure will be described.

Figure 2:
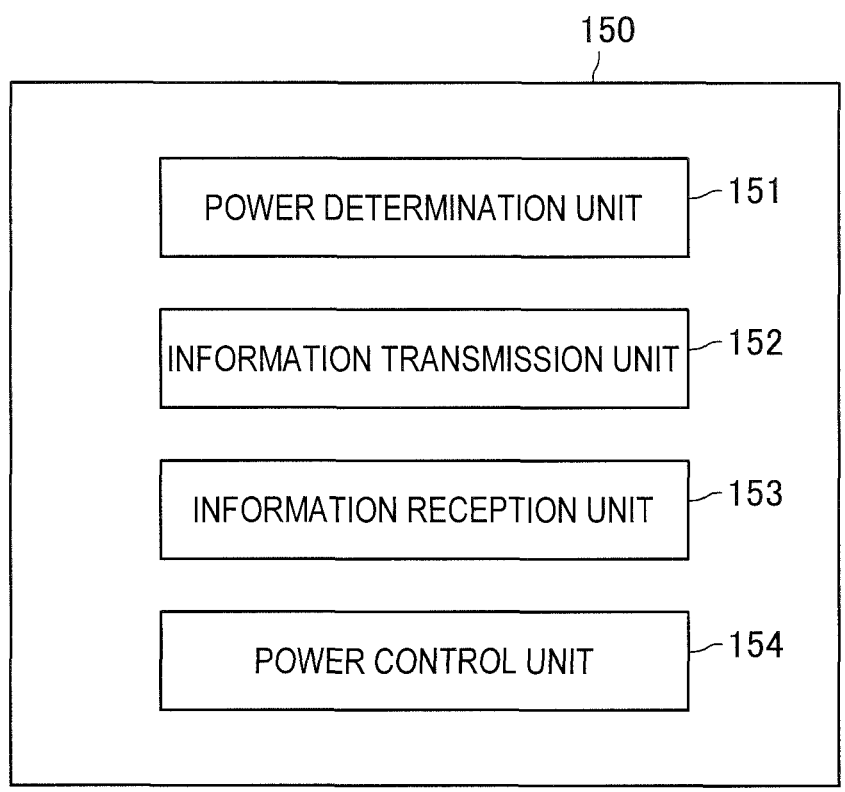
FIG. 2 is an illustrative diagram showing a functional configuration example of a controller 150 included in a power supplying device 100 according to an embodiment of the present disclosure.

FIG. 2 is an illustrative diagram showing a functional configuration example of the controller 150 included in the power supplying device 100 according to an embodiment of the present disclosure. The functional configuration example of the controller 150 included in the power supplying device 100 according to an embodiment of the present disclosure will now be described with reference to FIG. 2.

As shown in FIG. 2, the controller 150 includes a power determination unit 151, an information transmission unit 152, an information reception unit 153, and a power control unit 154.

The power determination unit 151 determines whether disruption of power supply from a commercial power source to the power supplying device 100 has occurred. The power determination unit 151 determines the presence or absence of the occurrence of disruption of power supply from a commercial power source, for example, by detecting the voltage value of a predetermined power line. Also, the power determination unit 151, when disruption of power supply from a commercial power source has occurred, determines whether the capacity of the battery 130 has become smaller than or equal to the predetermined amount due to power supply from the battery 130 to the apparatus 10.

If the power determination unit 151 determines that disruption of power supply from a commercial power source has occurred, and the capacity of the battery 130 has become smaller than or equal to the predetermined value, the power determination unit 151 operates to cause the information transmission unit 152 to transmit a request for power supply through the communication line 500.

The power determination unit 151, when receiving a request for power supply transmitted from another power supplying device 200, 300, or 400, determines whether power can be supplied to the device that has transmitted the request for power supply. If power can be supplied to the device that has transmitted the request for power supply, the power determination unit 151 operates to cause the information transmission unit 152 to transmit a response through the communication line 500, as a candidate for power supply.

The information transmission unit 152 transmits various items of information about supply and reception of power through the communication line 500. The information reception unit 153 receives various items of information about supply and reception of power through the communication line 500.

The information transmission unit 152, when the power determination unit 151 determines that disruption of power supply from a commercial power source has occurred, and the capacity of the battery 130 has become smaller than or equal to the predetermined value, transmits a request for power to the other power supplying devices 200, 300, and 400 through the communication line 500. Also, the information transmission unit 152 selects a power supplying device from which power will be supplied, on the basis of permission of power supply from the other power supplying devices 200, 300, and 400, and transmits a message that the selected power supplying device has been selected as a power supplier, to the selected power supplying device through the communication line 500.

The information reception unit 153 receives a request for power that is transmitted when it is determined that disruption of power supply from a commercial power source occurs in another power supplying device 200, 300, or 400, and the capacity of the battery has become smaller than or equal to the predetermined value.

When the information transmission unit 152 has received a request for power supply transmitted from another power supplying device 200, 300, or 400, then if the power determination unit 151 determines that power can be supplied to that power supplying device, the information transmission unit 152 transmits information for a response to that power supplying device, as a candidate for power supply. The response from the information transmission unit 152 may include information such as the cost of power supply, the time until the start of supply, the time for which power can be supplied, the past record of supply to the device requesting power supply, and the like. If the information transmission unit 152 transmits information for a response to that device, as a candidate for power supply, another power supplying device 200, 300, or 400, which has received the information, can determine a candidate for power supply on the basis of the information.

The request for power that is transmitted when disruption of power supply from a commercial power source has occurred, and the capacity of the battery 130 has become smaller than or equal to the predetermined value, may include, for example, the amount of power requested, the time zone of power supply requested, information about desired cost, the past record of reception of power, and the like. The response to power supply may include, for example, the amount of power that can be supplied, the time for which power can be supplied, information about the cost of power, the past record of supply to the device requesting power supply. The power supplying devices 100, 200, 300, and 400, when interchanging power through the direct-current bus line 600, exchange these items of information, and therefore, can determine a power supplier, a supply destination, a supply time, and the like.

Note that information transmitted by the information transmission unit 152 and information received by the information reception unit 153 may be encrypted. Information may be encrypted by the information transmission unit 152, and the encrypted information may be decrypted by the information reception unit 153. Information may be encrypted by an encryption scheme, such as symmetric-key cryptography, public-key cryptography, or the like.

If information transmitted by the information transmission unit 152 and information received by the information reception unit 153 are encrypted, inconvenience caused by a malicious third party tapping the information can be avoided. Also, prior to transmission of information from the information transmission unit 152 or reception of information by the information reception unit 153, an authentication process may be previously performed between the transmitter and the receiver. If an authentication process is previously performed between the transmitter and the receiver, inconvenience caused by spoofing or the like can be avoided. Note that, needless to say, the encryption scheme and the authentication scheme are not limited to particular schemes.

The power control unit 154 controls the supply of power from the DC/DC converter 140 through the direct-current bus line 600, and the reception of power by the DC/DC converter 140 through the direct-current bus line 600. The control of power supply and reception by the power control unit 154 is performed on the basis of information transmitted by the information transmission unit 152 or information received by the information reception unit 153.

Also, the power control unit 154, when receiving power supply from another power supplying device, may determine whether power can be supplied, on the basis of information such as the amount of power stored in the battery 130, the predicted power consumption of the apparatus 10 in the near feature, or the like.

The control of power supply and reception by the power control unit 154 will be described in detail below.

Although FIG. 2 shows a functional configuration example of the controller 150 included in the power supplying device 100, the controller 250 included in the power supplying device 200, the controller 350 included in the power supplying device 300, and the controller 450 included in the power supplying device 400 have a configuration similar to that shown in FIG. 2.

A functional configuration example of the controller 150 included in the power supplying device 100 according to an embodiment of the present disclosure has been described above with reference to FIG. 2. Next, an operation example of the power supply system 1 according to an embodiment of the present disclosure will be described.

[1.2. Operation Examples]

Figure 3:
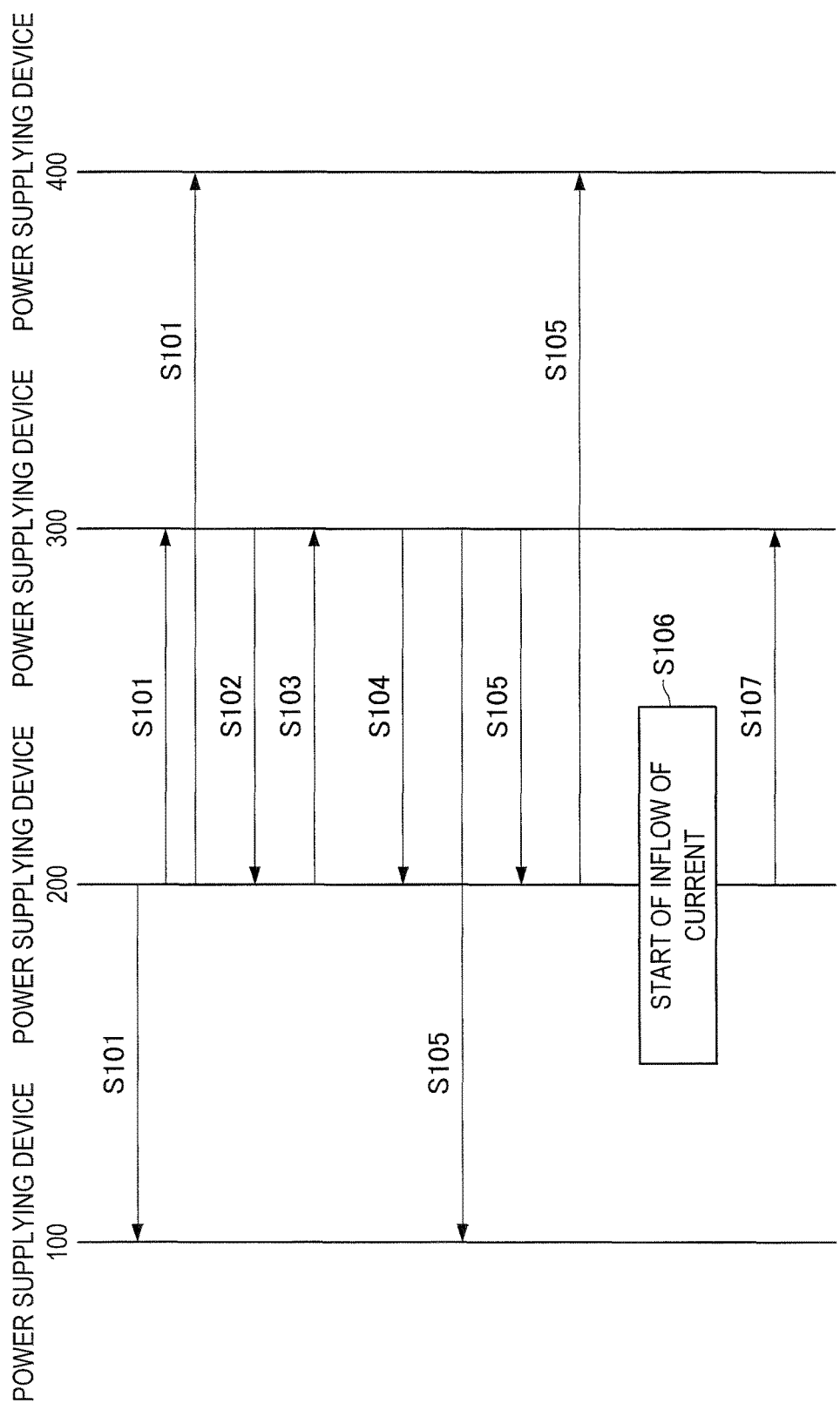
FIG. 3 is an illustrative diagram showing an operation example of a power supply system 1 according to an embodiment of the present disclosure using a sequence diagram.

FIG. 3 is an illustrative diagram showing an operation example of the power supply system 1 according to an embodiment of the present disclosure using a sequence diagram. The operation example of the power supply system 1 according to an embodiment of the present disclosure will now be described with reference to FIG. 3.

The flowchart shown in FIG. 3 shows an operation example that is performed when the power supplying device 200 requests power from the other power supplying devices 100, 300, and 400, due to disruption of power supply from a commercial power source.

Initially, when disruption of power supply from a commercial power source has occurred, and the capacity of battery 230 has become smaller than or equal to a predetermined amount, the power supplying device 200 transmits a request for power through the communication line 500 (step S101). The transmission of a request for power in step S101 may be performed by the controller 250.

Note that, in the example shown in FIG. 3, the power supplying device 200 transmits a request for power to all the other power supplying devices 100, 300, and 400, the present disclosure is not limited to such an example. For example, the power supplying device 200 may previously exchange information about the state of power including the state of the battery with the other power supplying devices 100, 300, and 400, and may transmit a request for power only to a power supplying device(s) that seems to be able to supply power. For example, the power supplying device 200 may transmit a request for power only to a power supplying device(s) in which the capacity of the battery remains greater than or equal to the predetermined amount according to the previously exchanged information.

Also, for example, the power supplying device 200 may previously decide to interchange power with a specific device when disruption of power supply from a commercial power source occurs. For example, if the power supplying device 200 have made an arrangement with the power supplying device 100 so that the power supplying device 100 supplies power to the power supplying device 200 when disruption of power supply from a commercial power source occurs, the power supplying device 200 may operate to transmit a request for power only to the power supplying device 100.

The other power supplying devices 100, 300, and 400, when receiving a request for power from the power supplying device 200, transmit a response to the power supplying device 200, as a power supplier candidate, provided that the other power supplying devices 100, 300, and 400 can supply power (step S102). When the response is transmitted, information such as the amount of power stored in the battery, the predicted power consumption in the near future, and the like, may be used. Also, the other power supplying devices 100, 300, and 400, when transmitting a response to the power supplying device 200, as a power supplier candidate, may transmit, as the response, information such as the cost of power supply, the time until the start of supply, the time for which power can be supplied, and the like, to the power supplying device 200.

The example shown in FIG. 3 shows a situation where only the power supplying device 300 transmits a response to the power supplying device 200, as a power supplier candidate. Of course, the present disclosure is not limited to such an example, and the other power supplying devices 100 and 400 may transmit a response to the power supplying device 200, as a power supplier candidate.

The power supplying device 200, when receiving a response from the power supplying device 300, transmits a message indicating that the power supplying device 300 has been selected as a power supplier, to the power supplying device 300 (step S103). The transmission of the information in step S103 may be performed by, for example, the controller 250.

The power supplying device 200, when selecting the power supplying device 300 as a power supplier, may make the selection on the basis of the information contained in the response transmitted from the power supplying device 300 in step S102.

In the example shown in FIG. 3, only the power supplying device 300 transmits a response to the power supplying device 200, as a power supplier candidate, and therefore, the power supplying device 200 selects the power supplying device 300 as a power supplier. Alternatively, when a plurality of power supplying devices transmit a response, as a power supplier candidate, the power supplying device 200 may select a power supplier on the basis of previously exchanged information, for example.

For example, when a plurality of power supplying devices transmit a response, as a power supplier candidate, the power supplying device 200 may select, as a power supplier, a power supplying device that is closest in distance with emphasis on efficiency, or a power supplying device that transmits a response indicating that the power supplying device can supply power at lowest cost with emphasis on cost, or a power supplying device that is highly likely to be able to supply power most stably on the basis of the past record of power supply.

Information about the position of each of the power supplying devices 100, 200, 300, and 400 may be previously stored in an internal recording medium (not shown), such as a memory or the like, and the position information may be contained in the response transmitted from a power supplier candidate in step S102.

Also, in the case where the power supplying device 200 selects, as a power supplier, a power supplying device that is highly likely to be able to supply power most stably on the basis of the past record of power supply, the power supplying device 200 previously performs a cumulative reliability process by, for example, increasing reliability for a power supplying device that has successfully supplied power which satisfies a request, and decreasing reliability for a power supplying device that has supplied power which does not satisfy a request. The power supplying device 200 may select, as a power supplier, a power supplying device that has highest such cumulative reliability.

Of course, the above rules of selection are merely illustrative, and the rules of selection of a power supplier in the present disclosure are not limited to those described above.

The power supplying device 300, which has been selected as a power supplier by the power supplying device 200, checks the voltage of the direct-current bus line 600. If the voltage of the direct-current bus line 600 is lower than or equal to a predetermined voltage value, the power supplying device 300 connects to the direct-current bus line 600 in an operation mode where the power supplying device 300 is a voltage source, and notifies the power supplying device 200 that the power supplying device 300 has become a power supplier (step S104). Also, at this time point, none of the power supplying devices has acquired the right to control the direct-current bus line 600. Therefore, the power supplying device 300 notifies all the power supplying devices 100, 200, and 400, which are connected to the communication line 500, that the power supplying device 300 has acquired the right to control the direct-current bus line 600 and is the master of the direct-current bus line 600 (step S105).

The power supplying device 200, when notified by the power supplying device 300 that the power supplying device 300 has become a power supplier, connects to the direct-current bus line 600 in an operation mode where the power supplying device 200 serves as a current absorption source, and starts inflow of current (step S106). The power supplying device 200 gradually increases the amount of current absorbed from the direct-current bus line 600 according to a predetermined rising curve. The power supplying device 200 may increase the amount of absorbed current up to a predetermined rated current for the direct-current bus line 600. Thereafter, the power supplying device 200 notifies the power supplying device 300, which is operating as the master of the direct-current bus line 600, of the amount of current absorbed from the direct-current bus line 600 (step S107).

When disruption of power supply from a commercial power source has occurred, and the capacity of battery 230 has become smaller than or equal to the predetermined amount, the power supplying device 200, which is going to receive power supply, performs an operation as shown in FIG. 3, and thereby can receive power supply from another power supplying device (in the example of FIG. 3, the power supplying device 300).

Also, the power supplying device 300, which is going to supply power, performs an operation as shown in FIG. 3, and thereby can supply power to another power supplying device requesting power (in the example of FIG. 3, the power supplying device 200).

As shown in FIG. 3, an operation example will be described which is performed in a case where while power is being supplied from the power supplying device 300 to the power supplying device 200, still another power supplying device requests power supply.

Figure 4:
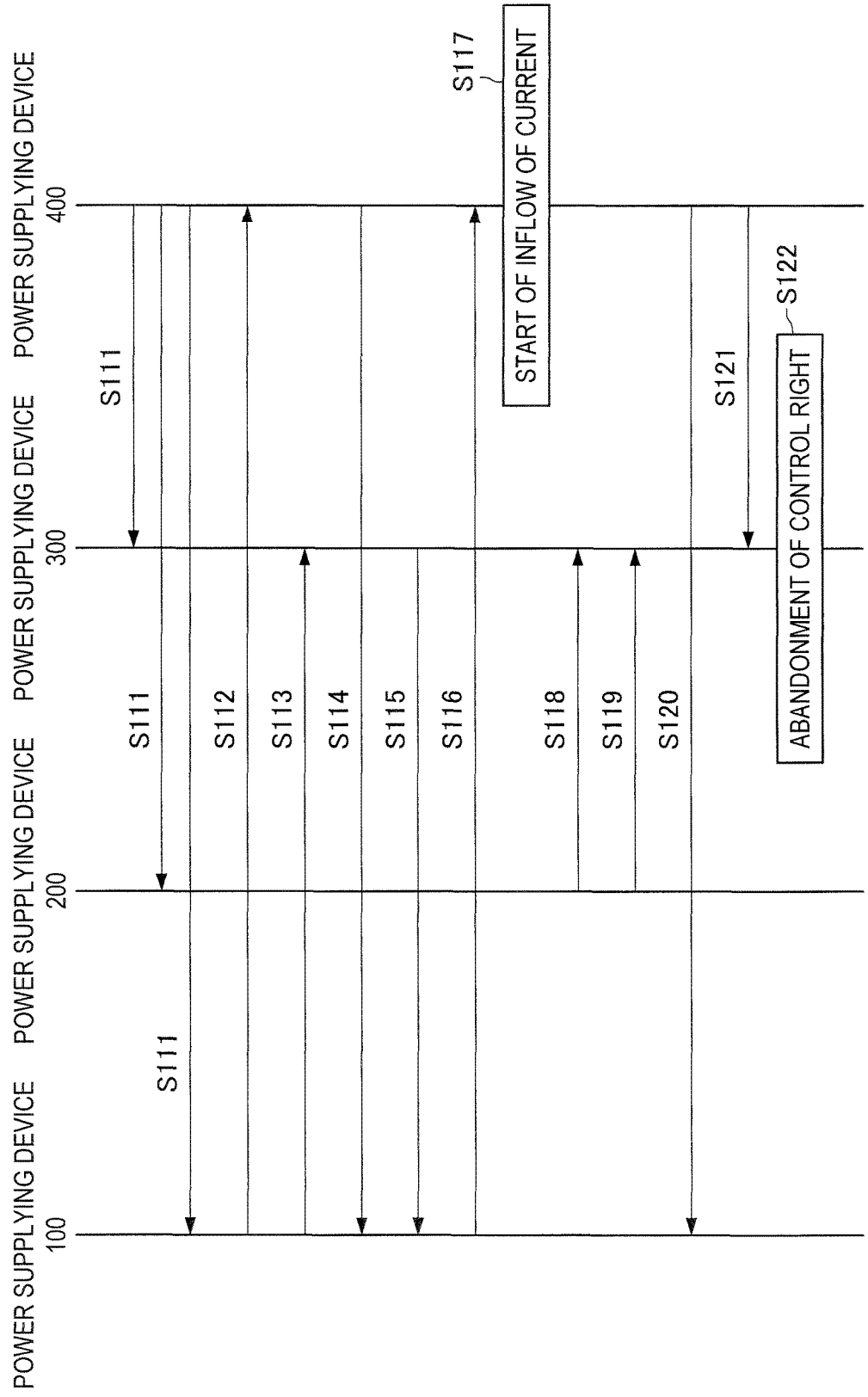
FIG. 4 is an illustrative diagram showing an operation example of a power supply system 1 according to an embodiment of the present disclosure using a sequence diagram.

FIG. 4 is an illustrative diagram showing an operation example of the power supply system 1 according to an embodiment of the present disclosure using a sequence diagram. The operation example of the power supply system 1 according to an embodiment of the present disclosure will now be described with reference to FIG. 4.

The flowchart shown in FIG. 4 shows an operation example which is performed when, as shown in FIG. 3, while power is being supplied from the power supplying device 300 to the power supplying device 200, still another power supplying device (here, the power supplying device 400) requests power supply.

When disruption of power supply from a commercial power source has occurred, and the capacity of the battery 430 has become smaller than or equal to the predetermined amount, the power supplying device 400 transmits a request for power through the communication line 500 (step S111). The transmission of a request for power in step S111 may be performed by the controller 250.

The other power supplying devices 100, 200, and 300, when receiving a request for power from the power supplying device 400, transmit a response to the power supplying device 400, as a power supplier candidate, in a manner similar to step S102 of FIG. 3, provided that the power supplying devices 100, 200, and 300 can supply power. If the power supplying device 300, which is supplying power to the power supplying device 200, can satisfy a request for power from the power supplying device 400, the power supplying device 300 transmits a response to the power supplying device 400, as a power supplier candidate.

The power supplying device 400 connects to the direct-current bus line 600 as with the power supplying device 200, which is receiving power supply from the power supplying device 300, and receives power from the power supplying device 300. At this time, the amount of supply from the power supplying device 300 is determined according to an instruction from the power supplying device 300, which is operating as the master of the direct-current bus line 600, so that the rating of the direct-current bus line 600 is not exceeded.

If the sum of a request from the power supplying device 200 and a request from the power supplying device 400 exceeds the rating of the direct-current bus line 600, the power supplying device 300, which is operating as the master, transmits, to the power supplying device 200 which is already supplying power, a request that the power supplying device 200 limits the amount of absorbed current, for example.

However, if the power supplying device 300 cannot satisfy a request for power from the power supplying device 400, the power supplying device 300 does not transmit a response to the power supplying device 400, as a power supplier candidate. FIG. 4 shows a situation where only the power supplying device 100 is a power supplier candidate and transmits a response to the power supplying device 400 (step S112). The power supplying device 100 transmits a response indicating that the power supplying device 100 is a power supplier candidate, to the power supplying device 300, which is operating as the master of the direct-current bus line 600, and requests permission for power supply to the direct-current bus line 600 (step S113).

The power supplying device 400, when receiving a response from the power supplying device 100, transmits, to the power supplying device 100, a message indicating that the power supplying device 100 has been selected as a power supplier (step S114). Also, the power supplying device 300, which is operating as the master of the direct-current bus line 600, transmits, to the power supplying device 100, a response indicating a limitation condition that the power supplying device 300 is already supplying power to the power supplying device 200, and there is a limit on power which can be supplied through the direct-current bus line 600 (step S115).

The power supplying device 100, which has been selected as a power supplier by the power supplying device 400, checks the voltage of the direct-current bus line 600. Here, the power supplying device 300 is already supplying power to the direct-current bus line 600, and therefore, the power supplying device 100 transmits a power supply schedule to the power supplying device 400 on the basis of the limitation condition transmitted in step S114 from the power supplying device 300 (step S116).

Thereafter, the power supplying device 100 starts power supply in a stepwise manner according to the supply schedule transmitted to the power supplying device 400, and the power supplying device 400 starts inflow of current from the direct-current bus line 600 in a stepwise manner according to the supply schedule (step S117).

Here, the power supplying device 300, which is the master of the direct-current bus line 600, can calculate the amount of current of the direct-current bus line 600 by each power supply from a connection path of the direct-current bus line 600, and allocate current to the power supplying devices 200 and 400, which receive power supply. At this time, power supplied from each power supplier (the power supplying devices 100 and 300) is specified for the power supplier, taking into consideration the fact that current flows a neighboring power requester (the power supplying devices 200 and 400).

For example, when the power supplying device 100 is closest to the power supplying device 200, the power supplying device 200 receives power from the power supplying device 300 earliest as a result of the effect of a resistance of the direct-current bus line 600 depending on the locations of a power requester and a power supplier. However, when the power supplying device 100 starts supplying, the power supplying device 200 receives power from the power supplying device 100. The power supplying device 400 receives power from the power supplying device 300.

Thereafter, when, for example, the capacity of the battery 230 of the power supplying device 200 has become greater than or equal to the predetermined value, or power supply from a commercial power source has been recovered, so that it is no longer necessary to receive power supply, the power supplying device 200 notifies the power supplying device 300 of a schedule for ending reception of power (step S118). Thereafter, the power supplying device 200 notifies the power supplying device 300 of the end of reception of power according to the schedule transmitted in step S118 (step S119).

Also, similarly, when, for example, the capacity of the battery 430 of the power supplying device 400 has become greater than or equal to the predetermined amount, or power supply from a commercial power source has been recovered, so that it is no longer necessary to receive power supply, the power supplying device 400 notifies the power supplying device 100 of a schedule for ending reception of power (step S120). Thereafter, the power supplying device 400 notifies the power supplying device 300, which is the master of the direct-current bus line 600, of the end of reception of power according to the schedule transmitted in step S119 (step S121).

The power supplying device 300, which is the master of the direct-current bus line 600, when notified of the end of power supply by all power requesters to confirm that all power requesters have ended reception of power, ends the control of the voltage of the direct-current bus line 600, and abandons the right to control the direct-current bus line 600 (step S122).

Figure 5:
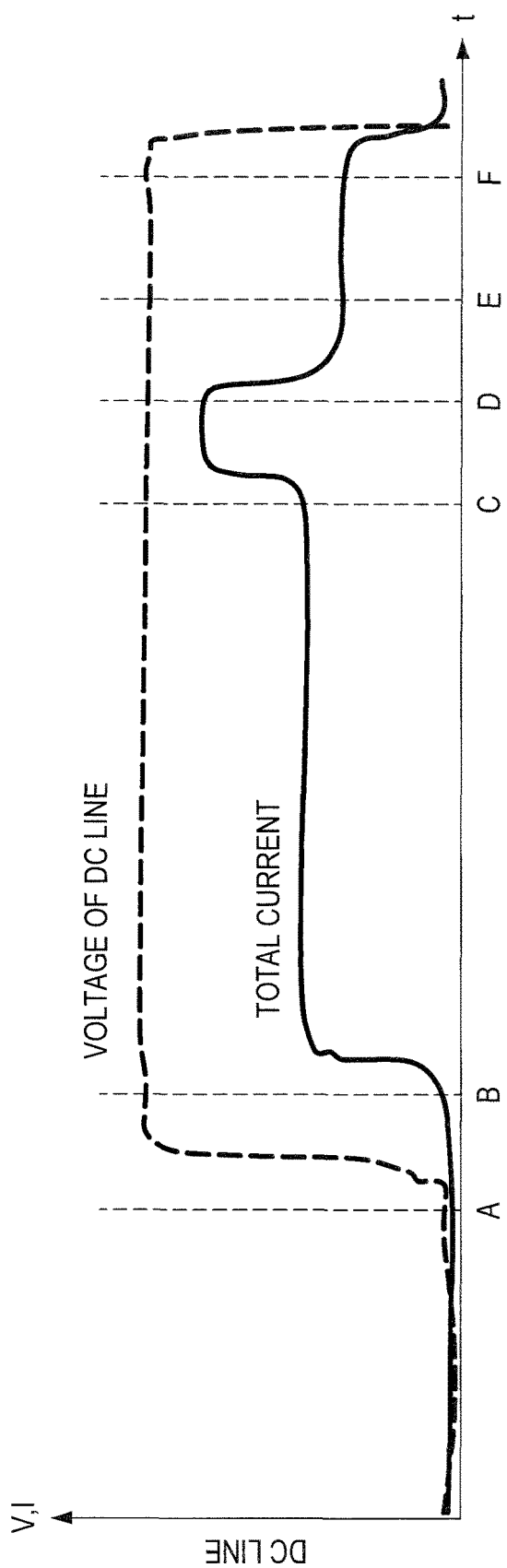
FIG. 5 is an illustrative diagram showing change examples in voltage and current of a direct-current bus line 600 in a power supply system 1 according to an embodiment of the present disclosure.

FIG. 5 is an illustrative diagram showing change examples in voltage and current of the direct-current bus line 600 in the power supply system 1 according to an embodiment of the present disclosure. FIG. 5 shows change examples in voltage and current of the direct-current bus line 600 in a case where the power supplying devices 100, 200, 300, and 400 operate according to the sequence diagrams of FIGS. 3 and 4.

The time point of time A of FIG. 5 corresponds to a time point when, in step S105 of FIG. 3, the power supplying device 300 acquires the right to control the direct-current bus line 600. At the time point of time A, the voltage of the direct-current bus line 600 is set to the rating.

The time point of time B of FIG. 5 corresponds to a time point when, in step S106 of FIG. 3, the power supplying device 200 starts inflow of current from the direct-current bus line 600. At the time point of time B, current starts flowing through the direct-current bus line 600.

The time point of time C of FIG. 5 corresponds to a time point when, in step S116 of FIG. 4, the power supplying device 400 starts inflow of current from the direct-current bus line 600. At the time point of time C, the amount of current flowing through the direct-current bus line 600 increases. The amount of current at this time is controlled by the power supplying device 300, which has acquired the right to control the direct-current bus line 600, so that the rating of the direct-current bus line 600 is not exceeded.

The time point of time D of FIG. 5 corresponds to a time point when, in step S118 of FIG. 4, the power supplying device 200 ends inflow of current from the direct-current bus line 600. When the power supplying device 200 ends inflow of current from the direct-current bus line 600, the amount of current flowing through the direct-current bus line 600 decreases.

The time point of time E of FIG. 5 corresponds to a time point when, in step S120 of FIG. 4, the power supplying device 400 ends inflow of current from the direct-current bus line 600. When the power supplying device 400 ends inflow of current from the direct-current bus line 600, the amount of current flowing through the direct-current bus line 600 further decreases, so that current does not flow through the direct-current bus line 600.

The time point of time F of FIG. 5 corresponds to a time point when, in step S121 of FIG. 4, the power supplying device 300 abandons the right to control the direct-current bus line 600. When the power supplying device 300 abandons the right to control the direct-current bus line 600, the voltage value of the direct-current bus line 600 is reset.

When disruption of power supply from a commercial power source has occurred, and the capacity of the battery 430 has become smaller than or equal to the predetermined amount, the power supplying device 400, which is going to newly receive power supply, performs an operation as shown in FIG. 4, and thereby can receive power supply from another power supplying device (in the example of FIG. 4, the power supplying device 100).

Also, the power supplying device 100, which is going to newly supply power, performs an operation as shown in FIG. 4, and thereby can supply power to another power supplying device requesting power (in the example of FIG. 4, the power supplying device 400).

A case where it is assumed that some device newly requests power during a period of time from the time point of time C to the time point of time D of FIG. 5, will be discussed. The power supplying device 300, which has the control right, determines whether current exceeding the rating of the direct-current bus line 600 flows through the direct-current bus line 600 due to the supply of power to that device. If it is determined that current exceeding the rating of the direct-current bus line 600 flows through the direct-current bus line 600 due to the new power supply, the power supplying device 300, which has the control right, instructs a power supplier and a supply destination to adjust the amount of current.

In addition to the operation examples shown in FIGS. 3 and 4, various power supply patterns may be conceived. For example, as shown in FIG. 3, a case where when power is supplied from the power supplying device 300 to the power supplying device 200, disruption of power supply from a commercial power source to the power supplying device 400, which is of high importance (power disruption causes a significant influence), will be discussed. In this case, the power supplying device 300 may operate to switch to power supply to the power supplying device 400 by decreasing the amount of power supplied to the power supplying device 200 or stopping power supply to the power supplying device 200.

When priority is given to power supply to the power supplying device 400, which is of high importance, the rules that the power supplying device 400 is a power supplying device that is of highest importance are previously provided as common rules held by all the power supplying devices 100, 200, 300, and 400.

When the rules that the power supplying device 400 is a power supplying device that is of highest importance are previously provided as common rules held by all the power supplying devices 100, 200, 300, and 400, then if disruption of power supply from a commercial power source to the power supplying device 400 occurs, the power supplying device 300 can switch to power supply to the power supplying device 400 by decreasing the amount of power supplied to the power supplying device 200 or stopping power supply to the power supplying device 200.

Also, in order to give priority to power supply to the power supplying device 400, the power supplying device 200, which receives power supply from the power supplying device 300, may also operate to agree with the power supplying device 300 on the decrease of power supply from the power supplying device 300.

<2. Conclusion>

As described above, according to an embodiment of the present disclosure, provided is a power supplying device that can receive power supply from another power supplying device through a direct-current bus line when disruption of power supply from a commercial power source has occurred, and the capacity of the battery has decreased. Also, according to an embodiment of the present disclosure, provided is a power supplying device that can supply power to another power supplying device through a direct-current bus line when disruption of power supply from a commercial power source has occurred in that power supplying device, and the capacity of the battery has decreased.

The behavior of a power supplying device that supplies power through a direct-current bus line varies depending on whether the power supply device has the right to control the direct-current bus line. When a power supplying device is going to supply power through a direct-current bus line, then if no power supplying devices have the right to control the direct-current bus line, the power supplying device that is going to supply power acquires the right to control the direct-current bus line, and controls the voltage and current values of power supplied through the direct-current bus line.

A power supplying device that is going to supply its own power through a direct-current bus line, when another power supplying device has the right to control the direct-current bus line, supplies power so that the rating of the direct-current bus line is not exceeded, on the basis of the voltage and current values of the direct-current bus line, which is controlled by the power supplying device having the control right.

Meanwhile, a power supplying device that is going to receive power supply through the direct-current bus line, requests power supply from other power supplying devices, and selects one from which power is to be supplied, from power supplying devices that have responded to that request. Various rules may be provided according to which, when a response has been received from a plurality of power supplying devices, a power supplying device selects one from which power is to be supplied.

For example, the rules that a power supplying device that is going to receive power supply from a direct-current bus line selects, with higher priority, one that supplies power at low cost or one that supplies a large amount of power, can be provided.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the communication line 500 may be wired or wireless. For example, the communication line 500 may be a so-called mesh network. Also, although, in this embodiment, a case where the communication line 500 and the direct-current bus line 600 are separate lines has been described, the present disclosure is not limited to such an example. For example, information about supply and reception of power may also be superimposed on the direct-current bus line 600. If information about supply and reception of power is superimposed on the direct-current bus line 600, the communication line 500 can be removed from the power supply system.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A power supplying device including:

a reception unit configured to receive, from another device, a request for power supply performed through a direct-current bus line through which DC power flows;

a power determination unit configured to determine whether power supply is possible, on the basis of the request for power supply;

a transmission unit configured to, when the power determination unit determines that the power supply is possible, transmits a response to the other device, as a candidate for power supply; and a power control unit configured to preform control to determine presence or absence of a right to control the direct-current bus line, and in a case of the absence of the control right, acquire the control right and notify the other device of the acquisition of the control right.

(2)

The power supplying device according to (1), wherein when the other device already have the control right, the power control unit performs control to transmit a response to the device requesting power and the device having the control right, as the candidate for power supply.

(3)

The power supplying device according to (1) or (2), wherein when the power supplying device has acquired the control right, then if there is not a device to which power is supplied through the direct-current bus line, the power control unit performs control to notify the other device of abandonment of the control right.

(4)

The power supplying device according to any of (1) to (3), wherein when the power supplying device has acquired the control right, and when the other device newly request power supply through the direct-current bus line, the power control unit performs control to notify the device that supplies power in response to the request for power supply of a limitation condition for power supply through the direct-current bus line.

(5)

The power supplying device according to any of (1) to (4), wherein the power determination unit determines whether power supply is possible in response to the request for power supply, on the basis of priority.

(6)

The power supplying device according to (5), wherein when power is being supplied to the other device, then if the request for power supply is newly transmitted from another device having higher priority, the power control unit performs control to decrease the amount of supply to the other device to which power is being supplied.

(7)

The power supplying device according to any of (1) to (6), further including:

a battery configured to store power, wherein the power determination unit determines whether power supply is possible, on the basis of the amount of power stored in the battery.

(8)

The power supplying device according to any of (1) to (7), wherein the power control unit determines whether supply is possible, on the basis of a past record of supply to the other device that has transmitted a request for power supply.

(9)

A power receiving device including:

a transmission unit configured to transmit a request for power supply performed through a direct-current bus line through which DC power flows, to other devices, when a predetermined condition is satisfied; and a power control unit configured to perform control to, when receiving a response from the other devices capable of supplying power as candidates for power supply, select at least one from the other devices that have transmitted responses, as a candidate for power supply, and transmit a request for power supply to the other device selected.

(10)

The power receiving device according to (9), wherein the power control unit, when ending reception of power from the other devices, performs control to notify another device having the right to control the direct-current bus line of the end of power reception.

(11)

The power receiving device according to (9) or (10), wherein the power control unit performs control to receive power from the other device which is the candidate for power supply in a manner that the rating of the direct-current bus line is not exceeded.

(12)

The power receiving device according to any of (9) to (11), wherein when the power receiving device is receiving power supply from the other devices, then if the request for power supply is newly transmitted from another device having higher priority, the power control unit performs control to agree with the other devices from which power supply is being received on decrease in the amount of supply.

(13)

The power receiving device according to any of (9) to (12), further including:

a battery configured to store power; and a power determination unit configured to, when the amount of power stored in the battery is smaller than or equal to a predetermined amount, that is, when the predetermined condition is satisfied, cause the transmission unit to transmit a request for power supply through the direct-current bus line to the other devices.

(14)

The power receiving device according to any of (9) to (13), wherein the power control unit determines whether the other device is selected as the candidate for power supply, on the basis of a past record of supply from the other device which, as a for power supply, have transmitted a response.

REFERENCE SIGNS LIST 1 power supply system
100, 200, 300, 400 power supplying device
110 AC/DC converter
120 DC/AC converter
130 battery
140 DC/DC converter
150 controller
151 power determination unit
152 information transmission unit
153 information reception unit
154 power control unit
500 communication line
600 direct-current bus line

The invention claimed is:

1. A power supplying device, comprising:
a controller configured to:
receive, from a first device of a plurality of devices, a first request to supply power through a direct-current bus line, wherein DC power flows through the direct-current bus line;
determine, based on the first request, whether the power supplying device is able to supply the power to the first device;
transmit a response to the first device based on the determination that the power supplying device is able to supply the power, wherein the response indicates the power supplying device as a candidate to supply the power;
determine one of a presence or an absence of a right to control the direct-current bus line, wherein the presence of the right to control the direct-current bus line indicates that a second device of the plurality of devices has the right to control the direct-current bus line;
acquire the right to control the direct-current bus line, based on the absence of the right to control;
notify the plurality of devices of the acquisition of the right to control the direct-current bus line; and
control the supply of the power through the direct-current bus line to the first device based on the acquired right to control the direct-current bus line.

2. The power supplying device according to claim 1, wherein the controller is further configured to transmit the response to the second device based on the second device having the right to control the direct-current bus line.

3. The power supplying device according to claim 1, wherein the controller is further configured to notify the plurality of devices of abandonment of the right to control based on absence of at least one of the plurality of devices that requires the supply of the power through the direct-current bus line.

4. The power supplying device according to claim 1, wherein the controller is further configured to:
receive, based on the acquisition of the right to control the direct-current bus line, a second request from a third device of the plurality of devices, wherein the second request is associated with a supply of the power through the direct-current bus line; and
notify the third device of a limitation condition based on the second request,
wherein the limitation condition is associated with the supply of the power through the direct-current bus line.

5. The power supplying device according to claim 1, wherein the controller is further configured to determine the power supplying device is able to supply the power to the first device based on a priority of the first device.

6. The power supplying device according to claim 5, wherein the controller is further configured to:
receive, from a third device of the plurality of devices, a new request to supply the power through the direct-current bus line; and
decrease an amount of the power supplied to the first device based on a priority of the third device that is higher than the priority of the first device.

7. The power supplying device according to claim 1, further comprising
a battery configured to store power,
wherein the controller is further configured to determine that the power supplying device is able to supply the power based on an amount of the power stored in the battery.

8. The power supplying device according to claim 1, wherein the controller is further configured to determine that the power supplying device is able to supply the power to the first device, based on a past record of the power supplied to the first device.

9. The power supplying device according to claim 1, wherein the controller is further configured to control the supply of the power through the direct-current bus line, such that the supply of the power is less than or equal to a power supply limit of the direct-current bus line.

10. The power supplying device according to claim 1, wherein the controller is further configured to notify the plurality of devices of the acquisition of the right to control the direct-current bus line before the control of the supply of the power through the direct-current bus line to the first device.

* * * * *